July 4, 1967
C. D. HARKLAU ET AL
3,329,094
SWITCHING VALVE
Filed Feb. 9, 1966
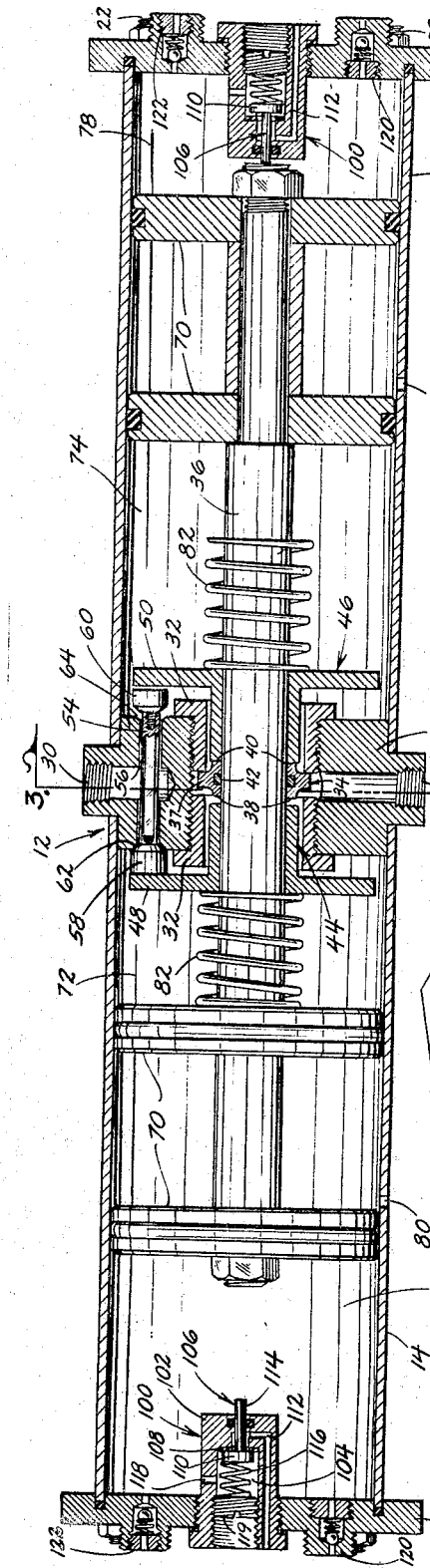
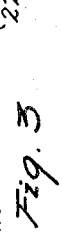
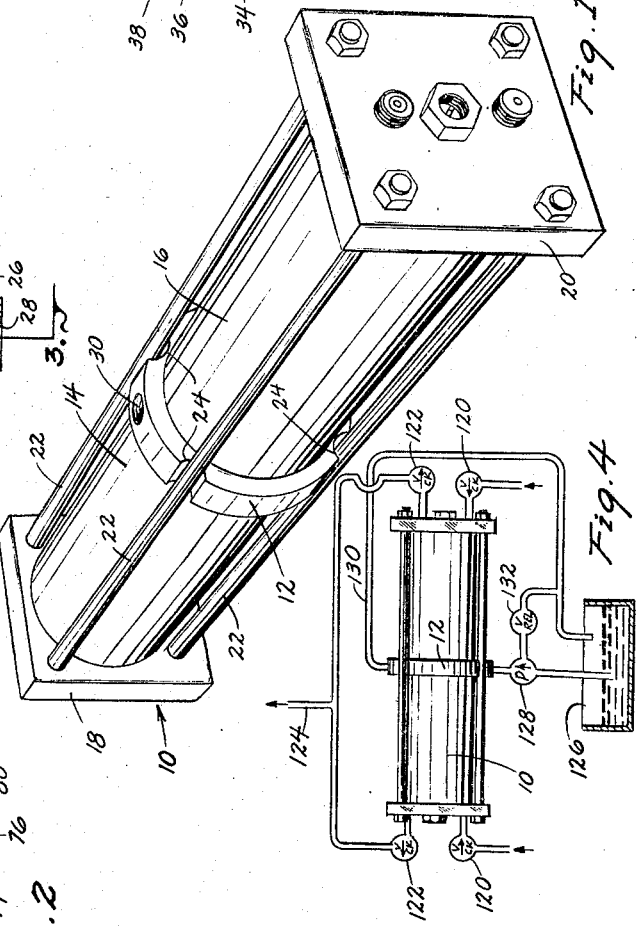
INVENTORS
CARROLL D. HARKLAU
ROGER L. HARKLAU
BY
Dick, Zarley, McKee & Thomte
ATTORNEYS

3,329,094
SWITCHING VALVE
Carroll D. Harklau and Roger L. Harklau, both of Gowrie, Iowa, assignors to Albert W. Vaudt, Twin Lakes, Iowa
Filed Feb. 9, 1966, Ser. No. 526,157
12 Claims. (Cl. 103—51)

This application is a continuation-in-part of applicants' co-pending application on a switching valve, Ser. No. 415,405, filed Dec. 2, 1964 which is a continuation-in-part of Ser. No. 347,906, filed Feb. 27, 1964, now Patent No. 3,276,381.

This invention relates to a valve assembly and in particular to a switching valve for use as a pump.

One of the principal objects of this invention is to provide a switching valve which is capable of producing very high pump pressures.

It is another object of this invention to provide a switching valve which may be used as a pump for pumping corrosive materials and cleaning materials or the like.

It is another object of this invention to provide a switching valve having a shaft extending therethrough with pistons on either end wherein the switching valve will instantaneously reverse the direction of the shaft and pistons at the end of each stroke.

A still further object of this invention is to provide a switching valve having an actuating means which is carried on a piston shaft extending through the valve.

A further specific object of this invention is to produce a switching valve having a shaft extending therethrough with pistons on either end and a pair of actuating collars mounted on said shaft for operating valve elements to alternately direct fluid pressures between chambers on opposite sides of the valve body.

Another object of this invention is to provide a switching valve having a material pumping piston which is adapted to pump material as it moves in both directions of its cycle of operation and with a minimum of pulsation.

A related object of this invention is to provide a switching valve having a material pump piston and a pulsation dampener in the material chamber for minimizing pulsations in the material pressure line as the piston changes directions in its operation.

A still further object of this invention is to provide a pulsation dampener including a valve which is maintained in its closed position in part by the pressures within the chamber thereby requiring a spring of minimum strength.

A still further object of this invention is to provide a switching valve having flow divider elements which are so constructed as to not remain on dead center when fluid pressures are applied to the valve.

A still further object of this invention is to provide a switching valve which will function at very low pressures on the fluid actuated piston or at very high pressures as desired.

A further object of this invention is to provide a switching valve which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a perspective view of the assembled switching valve pump;

FIG. 2 is a longitudinal cross-sectional view;

FIG. 3 is a transverse cross-sectional view taken along line 3—3 in FIG. 2; and

FIG. 4 is a schematic view of the switching valve including the fluid circuitry and the circuitry for the material work product.

The switching valve of this invention is referred to generally in FIG. 1 by the reference numeral 10 and includes a switching valve unit 12 having piston housing sleeves 14 and 16 on opposite sides thereof. A pair of end plates 18 and 20 are positioned on the ends of the sleeves 14 and 16 and held there by connecting rods 22 which extend the full length of the switching valve unit 10. The rods 22 engage the valve body 12 in recesses 24 formed around the outer peripheral edge thereof.

The valve unit 12 includes a body member 26 having a fluid inlet passageway 28 on one side and an outlet passageway 30 on the opposite side. A central opening is formed through the valve body 26 and receives from opposite sides thereof a pair of threaded inserts 32. An annular flow divider valve element 34 is positioned between the inner ends of the inserts 32 and is mounted on a piston shaft 36. As seen in FIG. 2, the flow divider valve element 34 has an annular center rim 37 which is adapted to seat against the adjacent inner end edges of the inserts 32. Radially inwardly, the valve element 34 is provided with annular surfaces 38 and 40 having a smaller diameter than the inner diameter of the inserts 32. A seal such as an annular O ring 42 is provided in the valve element 34 for sealing engagement around the piston shaft 36.

Positioned in the opposite ends of the inserts 32 are a pair of actuating collar members 44 and 46. These collar members include annular flanges 48 and 50 which have a diameter approximating that of the inner diameter of the piston housings 14 and 16. As seen, the collars 44 and 46 are loosely mounted on the shaft 36 and have a length along the shaft 36 such that their inner edges will engage the surfaces 38 and 40 to unseat the valve element 34 from the inner edges of the inserts 32. Thus, fluid introduced into the passageways 28 is permitted to flow all around the flow divider valve element 34 and is directed to one side or the other of the valve element 34 depending on its position between the inserts 32.

A second valve element 54 is provided in an elongated passageway 56 formed in the valve body 26 which is in communication with the outlet passageway 30. The elongated valve element 54 is provided with enlarged seat portions 58 and 60 at opposite ends thereof and on the exterior of the valve body 26. The flanges 48 and 50 on the collars 44 and 46 have a diameter sufficiently great enough to permit them to engage the seat portions 58 and 60. The seat portions 58 and 60 will sealingly engage alternately a pair of seats 62 and 64 formed in the exterior sides of the valve body 26. As seen in FIG. 3, the valve element 54 includes a series of uniformly disposed arcuate longitudinal recesses 66 which cooperate with the inside wall of the passageway 56 to form passageways 68 for communication with the outlet 30. The shaft 36 has a pair of pistons 70 at either end on opposite sides of the valve body 26. Thus, a pair of fluid chambers 72 and 74 are formed between the pistons 70 and the valve body 26. Between the end plates 18 and the outer pistons 70 material chambers 76 and 78 are formed. A visual drain opening 80 is formed in the housing members 14 and 16 and is disposed such that it is always between the pistons 70 and consequently if fluid from the chambers 72 and 74 escape passed the piston heads it will be recognized as it falls by gravity through the drain opening 80. Conversely, if the work product material in the chamber 76 escapes passed the pistons 70 it also will drip from the drain opening 80. Therefore, a constant check on the piston seals is provided.

A pair of coil springs 82 are disposed on the piston shaft 36 between the pistons 70 and the adjacent collars 44 and 46. The springs 82 are adapted to free float along the shaft 36 but when compressed against the collars will serve to snap the elongated valve element 54 and the annular flow divider valve element 34 to their alternate positions and thereby give instantaneous switching.

A pulsation dampener unit 100 is positioned on the longitudinal center axis of the switching valve unit 10 in the end plates 18 and 20. A body plug 102 is threadably received in the end plates 18 and 20 and is provided with a chamber 104. A valve element 106 extends through the inner end of the plug body 102 for engagement with the outer ends of the piston shaft 36 as seen at the right end of FIG. 2. A seal 108 is provided for a shoulder 110 of the valve element 106 to seat upon to close a passageway 112 in communication with the exterior of the switching valve unit 10. A stem portion 114 extends through the inner end wall of the chamber 104 along its center longitudinal axis and is exposed for engagement with the end of the shaft 36. The valve element 106 is normally held in a closed position by a spring 116 and additionally the material pressures in the chambers 76 and 78 which act on the valve element 106 through a passageway 118. A threadable set screw 119 is provided for adjusting the tension in the spring 118.

As seen in FIG. 4, a pair of inlet check valves 119 are provided in the end plates 18 and 20 and additionally a pair of outlet check valves 122 are provided. A T conduit 124 interconnects both of the outlet valves 122 and is adapted to be connected to a spray gun (not shown) or the like. Paint material or the like is drawn into the material chambers 76 and 78 through the inlet check valves 120.

Hydraulic fluid or the like is maintained in a reservoir 126 which is in communication with a pump 128 connected to the inlet 28 of the valve 12. An outlet conduit 130 is connected to the outlet 30 of the valve 12 and returns the fluid to the reservoir 126. A pressure relief valve 132 is provided between the outlet conduit 130 and the pump 128.

In operation it is seen that the pump 128 will introduce fluid into the inlet port 28 and as seen in FIG. 2 will pass to the left of the flow divider element 34 into the fluid chamber 72. As illustrated in FIG. 2, the shaft and pistons have just completed their stroke to the right end and are beginning to move to the left end of the unit. As the fluid accumulates in the chamber 72 the pistons 70 will be forced to the left and the collar 44 will maintain pressure on the seat portion 58 to close off the passageway 68 connecting with the outlet 30. The pressure of the fluid on the flow divider 34 will maintain it in its sealing engagement with the inner annular edge of the insert 32 thereby sealing the chamber 74 from the fluid. After the pistons have moved to their extreme left-hand position, the spring 82 in the fluid chamber 74 will be compressed against the collar 46 which will seat the seat portion 60 in the passageway 56 and engage the valve element 34 to unseat it from the insert 32 and in turn move the valve element 34 to a seating sealing position against the annular end of the left-hand insert 32. Thus, fluid will now enter through the inlet port 28 and pass to the right-hand chamber 74 and escape from the left-hand chamber 72 as the pistons 70 move towards the right. The pressure being built up in the chamber 74 as the pistons move to the left will maintain the seat portion 60 in its closed position as the flange 50 of the collar 46 will continue to bear thereagainst as well as bear against the surface 40 of the valve element 34. Once the pistons and shaft have moved completely to the lefthand position the compression in the spring 82 in the chamber 74 will be built up to a point where the spring will force the collar 46 against the seat portions 60 and the valve element 34 to snap them to their left-hand positions.

At the end of each stroke of the pistons 70 on the shaft 36 the shaft 36 will engage the circular stem 114 and move the valve element 106 off the sealing seat 108 to permit a small amount of work product material in the chambers 76 and 78 respectively to spurt out through the passageways 112. This small amount of relief in the pressure in the chambers 76 and 78 will permit the completion of the half cycle and substantially speed up the reversal in directions of the shaft and pistons such that pressure may then be accumulated in the chamber at the opposite end. As a consequence, a more constant pressure is maintained in the material outlet line 124 by virtue of the fact that instantaneous switching in the direction of the pistons is accomplished by the use of the pulsation dampener 100 at opposite ends of the switching valve 10 in the material chambers 76 and 78. It is appreciated that only a small amount of material from the chambers 76 and 78 is lost during each half stroke and if desired this material could be returned to the material reservoir (not shown). Accordingly, a smooth flow of cleaning material or the like will appear at the outlet conduit 124. It is also to be appreciated that the springs 82 on the shafts 36 helps to instantaneously cause the switching of the valve elements 54 and 34.

Some changes may be made in the construction and arrangement of our switching valve without departing from the real spirit and purpose of our invention, and it is our intention to cover by our claims, any modified forms of structure or use of mechanical equivalents which may be reasonably included within their scope.

We claim:
1. In a switching valve, comprising,
a housing,
a valve body disposed in said housing,
a chamber in said housing on each side of said valve body,
said valve body having a pair of elongated passageways extending therethrough, each of said passageways being in communication between each of said chambers,
said valve body having an inlet opening in communication with one of said passageways,
said valve body having an outlet opening in communication with the other of said passageways,
a shaft disposed in said one passageway, said one passageway having a cavity,
valve means movably mounted on said shaft in said cavity, for alternately at times placing one chamber in communication with said inlet opening and closing said other chamber to communication with said inlet opening, and at other times placing said other chamber in communication with said inlet opening and closing said one chamber to communication with said inlet opening,
means in said other passageway for alternately at times placing one chamber in communication with said outlet opening and closing said other chamber to communication with said outlet opening, and at other times placing said other chamber in communication with said outlet opening and closing said one chamber to communication with said outlet opening,
actuating means adapted to operatively engage said means in each of said passageways for co-ordinating said means in each of said passageways for at times said one chamber to be in communication with said inlet opening and said other chamber in communication with said outlet opening, and at other times said one chamber to be in communication with said outlet opening with said other chamber in communication with said inlet opening, and
a valve seat is provided in said cavity on opposite sides of said valve means movably mounted on said shaft, said actuating means including an actuating element on opposite sides of said valve means and movable in said one passageway for alternately engaging said valve means and moving said valve means back and forth between said valve seats.

2. The structure of claim 1 wherein said actuating element is a collar slidably mounted on said shaft on either side of said cavity and having a portion disposed externally of said valve body for engaging the adjacent end of said elongated element in said other passageway, and the inner edges of said collars being adapted to engage said valve means in said cavity.

3. In a switching valve, comprising,
a housing,
a valve body disposed in said housing,
a chamber in said housing on each side of said valve body,
said valve body having a pair of elongated passageways extending therethrough, each of said passageways being in communication between each of said chambers,
said valve body having an inlet opening in communication with one of said passageways,
said valve body having an outlet opening in communication with the other of said passageways,
a shaft disposed in said one passageway, said one passageway having a cavity,
valve means movably mounted on said shaft in said cavity for alternately at times placing one chamber in communication with said inlet opening and closing said other chamber to communication with said inlet opening, and at other times placing said other chamber in communication with said inlet opening and closing said one chamber to communication with said inlet opening,
means in said other passageway for alternately at times placing one chamber in communication with said outlet opening and closing said other chamber to communication with said outlet opening, and at other times placing said other chamber in communication with said outlet opening and closing said one chamber to communication with said outlet opening,
actuating means adapted to operatively engage said means in each of said passageways for co-ordinating said means in each of said passageways for at times said one chamber to be in communication with said inlet opening and said other chamber in communication with said outlet opening, and at other times said one chamber to be in communication with said outlet opening with said other chamber in communication with said inlet opening,
said one passageway is further defined as having passageway portions on opposite sides of said cavity, said cavity means being adapted to move said means in said cavity alternately between a first position in sealing engagement with one passageway portion to a second position in sealing engagement with the other passageway portion, said inlet opening being in communication with said cavity,
said other passageway is defined as having seat means at opposite ends thereof, and said means in said other passageway is defined as including an elongated element extending the length of said other passageway and having closure elements on opposite ends,
said actuating means being adapted to move alternately said elongated element in one direction placing one of said closure elements in sealing engagement with the adjacent seat means and then in the opposite direction to place the other closure element in sealing engagement with the adjacent seat means, said outlet opening being in communication with said other passageway at a point between said seat means at opposite ends of said other passageway, and
said actuating means includes a collar slidably mounted on said shaft on either side of said cavity and having a portion disposed externally of said valve body for engaging the adjacent end of said elongated element in said other passageway, and the inner edges of said collars being adapted to engage said means in said cavity.

4. The structure of claim 3 wherein said portion of said collar is further defined as being circular in shape and said collar is freely rotatably mounted on said shaft.

5. The structure of claim 3 and a piston is mounted on opposite sides of said valve body at either end of said shaft in said chambers.

6. The structure of claim 5 wherein means operatively connects each of said pistons to the adjacent collar to actuate said means in said chamber and said elongated element in said other chamber.

7. The structure of claim 6 wherein said means operatively connecting said pistons to said collars are coil springs mounted on said shaft between said pistons and said collars.

8. The structure of claim 5 and each of said pistons cooperate with said valve body to form a fluid chamber portion, and each of said pistons cooperate with the outer end of the housing to form a material chamber portion, an inlet and an outlet passageway being connected to each of said material chamber portions, and a second outlet passageway in each of said material chamber portions, a normally closed valve means in each of said second outlet passageways, means for operatively engaging the adjacent piston to open said valve means each time said shaft and piston move to either end of said housing.

9. The structure of claim 8 wherein said pistons, valve means and actuating means are so arranged that upon said pistons reaching one end of said housing said adjacent valve means is actuated, and substantially simultaneously said means in said cavity and said elongated element are actuated to reverse the flow of fluid into and out of said fluid chamber portions thereby reversing the direction of movement of said shaft and pistons.

10. The structure of claim 9 wherein said valve means in each of said outlet passageways is exposed to the pressures in said chamber which tend to move said valve means towards a closed position.

11. In the class described,
a housing having a chamber,
a piston movably disposed in said chamber,
an inlet and an outlet opening in communication with said chamber,
means for reciprocating said piston back and forth in said chamber through expansion and compression strokes for material to be drawn into said chamber on the expansion stroke through said inlet opening and discharged from said chambers on the compression stroke through said outlet opening,
a second outlet opening in said chamber,
a normally closed valve means in said second outlet opening, and
means operable by said piston for opening said valve means at the end of said compression stroke, said valve means being exposed to the pressures in said chamber which tend to maintain said valve means in a closed position, and a spring means is provided in engagement with said valve means to yieldably maintain said valve means in a closed position.

12. The structure of claim 11 wherein said valve means in said second outlet opening includes a valve chamber, a pair of passageways extending between said valve chamber and the adjacent piston chamber, a third passageway extending between one of said pair of passageways and the atmosphere, a valve element in said one passageway and having a portion exposed in said piston chamber for engagement by said piston and a relatively larger portion exposed in said valve chamber, a seal on said valve element in said one passageway between said third passageway and said piston chamber, pressures in said piston chamber adapted to communicate through said other passageway with said valve chamber and bear against said larger portion of said valve element to bias said valve element towards a closed position.

References Cited

UNITED STATES PATENTS

| | | | |
|---|---|---|---|
| 840,886 | 1/1907 | Wilkins | 91—329 |
| 1,129,362 | 2/1915 | Ryder | 103—51 |
| 1,164,926 | 12/1915 | Clark | 103—51 |
| 2,370,068 | 2/1945 | Palm | 91—329 |
| 2,555,018 | 5/1951 | Von Seggern | 91—329 |
| 2,642,045 | 6/1953 | Potts | 91—329 X |

FOREIGN PATENTS 554,352   3/1958   Canada.

ROBERT M. WALKER, *Primary Examiner.*